(12) United States Patent
Ouderkirk et al.

(10) Patent No.: US 11,366,260 B1
(45) Date of Patent: Jun. 21, 2022

(54) OPTICAL SYSTEM WITH POLARIZATION VOLUME HOLOGRAM

(71) Applicant: Facebook Technologies, LLC, Menlo Park, CA (US)

(72) Inventors: Andrew John Ouderkirk, Menlo Park, CA (US); Hannah Noble, Menlo Park, CA (US); Babak Amirsolaimani, Menlo Park, CA (US); Yusufu Njoni Bamaxam Sulai, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 441 days.

(21) Appl. No.: 16/417,334

(22) Filed: May 20, 2019

(51) Int. Cl.
| | |
|---|---|
| *G02B 5/32* | (2006.01) |
| *G03H 1/02* | (2006.01) |
| *G03H 1/22* | (2006.01) |
| *G02B 27/09* | (2006.01) |
| *G02B 5/30* | (2006.01) |

(52) U.S. Cl.
CPC ............. *G02B 5/32* (2013.01); *G02B 5/3025* (2013.01); *G02B 27/0955* (2013.01); *G02B 27/0977* (2013.01); *G03H 1/024* (2013.01); *G03H 1/2202* (2013.01); *G03H 1/2286* (2013.01)

(58) Field of Classification Search
CPC ...... G02B 27/286; G02B 27/28; G02B 27/01; G02B 27/0101; G02B 27/017; G02B 27/0172; G02B 27/0977; G02B 27/0955; G02B 27/0944; G02B 27/283; G02B 27/0093; G02B 27/0174; G02B 2027/0174; G02B 2027/0178; G02B 2027/0138; G02B 2027/0107; G02B 5/3025; G02B 5/3083; G02B 5/30; G02B 5/3033; G02B 2005/1804; G03H 1/024; G03H 1/2202; G03H 1/0493; G03H 1/202; G03H 1/0248; G03H 1/0272; G03H 1/0256; G03H 2250/41; G03H 2270/55; G03H 2270/22; G03H 2270/20; G03H 2226/05
USPC .......................................... 359/15
See application file for complete search history.

(56) References Cited

U.S. PATENT DOCUMENTS

| | | | | |
|---|---|---|---|---|
| 2008/0278675 | A1* | 11/2008 | Escuti ................. | G02B 27/283 349/201 |
| 2017/0351134 | A1* | 12/2017 | Shimatani .......... | G02B 27/0101 |
| 2017/0373459 | A1* | 12/2017 | Weng .................... | G02B 30/25 |
| 2018/0039052 | A1* | 2/2018 | Khan ................... | G02B 27/283 |
| 2018/0239177 | A1* | 8/2018 | Oh ....................... | G02B 6/0055 |

* cited by examiner

*Primary Examiner* — Stephone B Allen
*Assistant Examiner* — Jyotsna V Dabbi
(74) *Attorney, Agent, or Firm* — Millburn IP PLLC (57) ABSTRACT

An optical system includes an optical lens, a polarization volume hologram (PVH) layer arranged over the optical lens, and an IR absorbing structure arranged between the optical lens and the PVH layer. The PVH layer being configured to reflect infrared (IR) light. The IR absorbing structure includes a quarter-wave plate (QWP) arranged between the optical lens and the PVH layer and a linear absorptive polarizer arranged between the QWP and the optical lens. The linear absorptive polarizer is configured to absorb IR light.

17 Claims, 10 Drawing Sheets

OPTICAL SYSTEM WITH POLARIZATION VOLUME HOLOGRAM

TECHNICAL FIELD

The present disclosure relates to an optical system and, more specifically, to an optical system having a polarization volume hologram layer.

BACKGROUND

Head-Mounted Display (HMD) has been widely used in, e.g., video playback, gaming, and sports. One major application of HMD is to realize virtual reality (VR) or augmented reality (AR). An HMD usually needs to be compact and light weight, and have high resolution, large field of view (FOV), and small form factors. An HMD generally has a display element configured to generate image light that passes through a lens system to reach a user's eyes. The lens system includes multiple optical elements, such as lenses, waveplates, reflectors, etc., for focusing the image light to the user's eyes.

To achieve a compact size and light weight but maintain good optical characteristics, an HMD often uses a pancake lens in the lens system. However, because a pancake lens usually has more reflectors or partial reflectors than a conventional lens, various issues may arise in the lens system having a pancake lens.

SUMMARY

In accordance with the disclosure, there is provided an optical system including an optical lens, a polarization volume hologram (PVH) layer arranged over the optical lens, and an IR absorbing structure arranged between the optical lens and the PVH layer. The PVH layer being configured to reflect infrared (IR) light. The IR absorbing structure includes a quarter-wave plate (QWP) arranged between the optical lens and the PVH layer and a linear absorptive polarizer arranged between the QWP and the optical lens. The linear absorptive polarizer is configured to absorb IR light.

Also in accordance with the disclosure, there is provided an optical system including an optical lens, a polarization volume hologram (PVH) layer arranged over the optical lens, and an absorbing film arranged between the optical lens and the PVH layer. The PVH layer is configured to reflect infrared (IR) light. The absorbing film is made of an IR absorbing material.

Also in accordance with the disclosure, there is provided an optical system including an optical lens, a first polarization volume hologram (PVH) layer arranged over the optical lens, and a second PVH layer arranged between the optical lens and the first PVH layer. The first PVH layer and the second PVH layer are configured to reflect IR light of an approximately same wavelength.

DETAILED DESCRIPTION

Hereinafter, embodiments consistent with the disclosure will be described with reference to drawings, which are merely examples for illustrative purposes and are not intended to limit the scope of the disclosure. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. The described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides an optical system having a pancake lens and using one or more polarization volume hologram (PVH) layers configured to reflect infrared (IR) light for, e.g., eye tracking purposes. The optical system further includes an element configured to reduce or eliminate ghost effect caused by the pancake lens.

A PVH layer can include a birefringent material layer including a plurality of birefringent molecules, and is also referred to as, e.g., "polarization sensitive gratings," "polarization sensitive optical elements," "liquid crystal gratings," or "chiral liquid crystal elements." For example, the PVH layer can include a liquid crystal (LC) layer including a plurality of liquid crystal (LC) molecules. The LC molecules are spatially orientated to enable at least one optical function of the PVH layer.

Figure 1A:
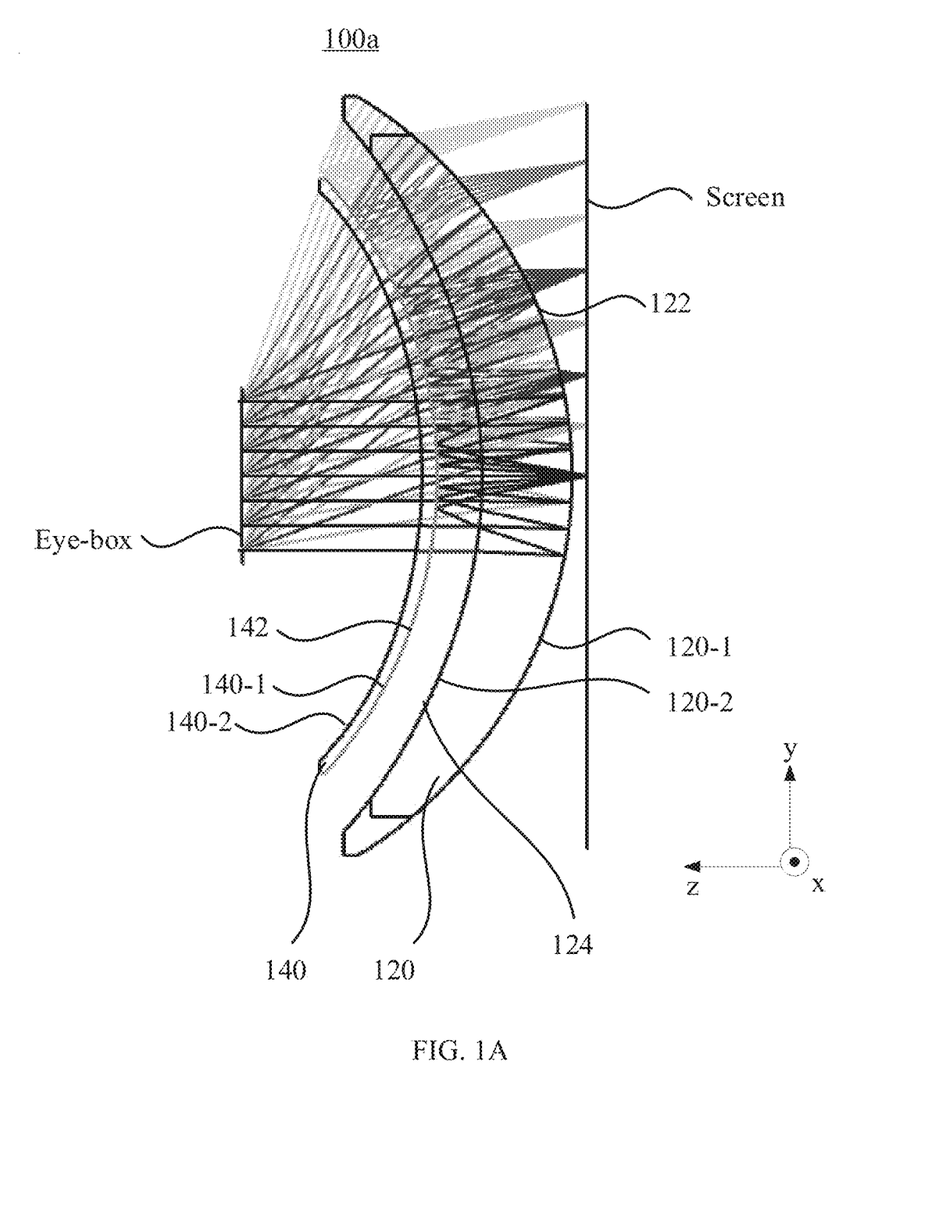
FIGS. 1A-1C schematically shows example pancake lenses consistent with the disclosure.

FIG. 1A schematically shows an example pancake lens 100a consistent with the disclosure. The pancake lens 100a can be used in an optical system, such as a head-mounted display (HMD), to focus light from a screen to an eye-box, as shown in FIG. 1A. Hereinafter, the light emitted by the screen for forming images is also referred to as "image light." As shown in FIG. 1A, the pancake lens 100a includes a back optical element 120 that alters the image light from the screen, and a front optical element 140 coupled to the back optical element 120 to further alter the image light.

The back optical element 120 includes a first surface 120-1 configured to receive the image light from the screen and an opposing second surface 120-2 configured to output altered image light. The back optical element 120 further includes a mirrored surface 122 and a waveplate surface 124, which are separate layers or coatings that are bonded to or formed on the back optical element 120. The waveplate surface 124 can be bonded to or formed on the second surface 120-2 of the back optical element 440, and the mirrored surface 124 can be bonded to or formed on the first surface 120-1 of the back optical element 120.

The mirrored surface 122 can be a partial reflector that is partially reflective to reflect a portion of the received light. In some embodiments, the mirrored surface 122 can be configured to transmit about 50% of incident light and reflect about 50% of the incident light. Such a mirrored surface is also referred to as a 50/50 mirror. In some embodiments, the waveplate surface 124 can be a quarter-wave plate (QWP) that alters the polarization of received light. A QWP includes a polarization axis, and the polarization axis of the QWP can be oriented relative to incident linearly polarized light to convert the linearly polarized light into circularly polarized light or vice versa.

The front optical element 140 has a first surface 140-1 facing the back optical element 120 and an opposing second surface 140-2 distal from the back optical element 120. As shown in FIG. 1A, the front optical element includes a reflective polarizer surface 142, also referred to as a "reflective polarizer," which can be a layer or a coating that is bonded to or formed on the front optical element 140. In some embodiments, the reflective polarizer surface 142 can be bonded to or formed on the first surface 140-1 or the second surface 140-2 of the front optical element 140. In one embodiment, as shown in FIG. 1A, the reflective polarizer surface 142 is bonded to or formed on the first surface 140-1 of the front optical element 140.

The reflective polarizer surface 142 can be a partially reflective mirror configured to reflect received light of a first linear polarization and transmit received light of a second linear polarization. That is, the reflective polarizer surface 142 can be a linear reflective polarizer surface. For example, the reflective polarizer surface 142 can be configured to reflect light that is linearly polarized in the x-direction (as in FIG. 1A) and transmit light that is linearly polarized in the y-direction (as in FIG. 1A).

In some embodiments, one or more of the first surface 120-1 and the second surface 120-2 of the back optical element 120 and the first surface 140-1 and the second surface 140-2 of the front optical element 140 can be curved surface(s). In some embodiments, either or both of the waveplate surface 124 and the reflective polarizer surface 142 can include liquid crystal (LC) optical film(s). For example, the waveplate surface 124 can be an LC quarter-wave plate, and/or the reflective polarizer surface 142 can be an LC linear reflective polarizer surface.

As shown in FIG. 1A, light from the screen can be first transmitted to the mirrored surface 122. A first portion of the light may be reflected by the mirrored surface 122, and a second portion of the light may be transmitted through the mirrored surface 124 and the waveplate surface 124 towards the reflective polarizer surface 142. In some embodiments, the mirrored surface 122 can be a 50/50 mirror and, thus, about 50% of the light emitted from the screen may be transmitted through the mirrored surface 122 towards the waveplate surface 124, and about 50% of the light may be reflected by the mirrored surface 122.

The light transmitted through the mirrored surface 122 can be circularly polarized, which, after passing through the waveplate surface 124, can be converted to linearly polarized light. The reflective polarizer surface 142 can be configured such that a blocking direction of the reflective polarizer surface 142 aligns with the polarization direction of the linearly polarized light. Hence, the light incident onto the reflective polarizer surface 142 may be reflected by the reflective polarizer surface 142. The reflected light may be transmitted through the waveplate surface 124 towards the mirrored surface 122, reflected by the mirrored surface 122 towards the waveplate surface 124, and then transmitted through the reflective polarizer surface 142 because the light has changed the polarization through reflections and/or transmission through the waveplate surface 124 and the mirrored surface 122. The light transmitted through the reflective polarizer surface 142 may be focused to the eye-box.

Figure 1B:
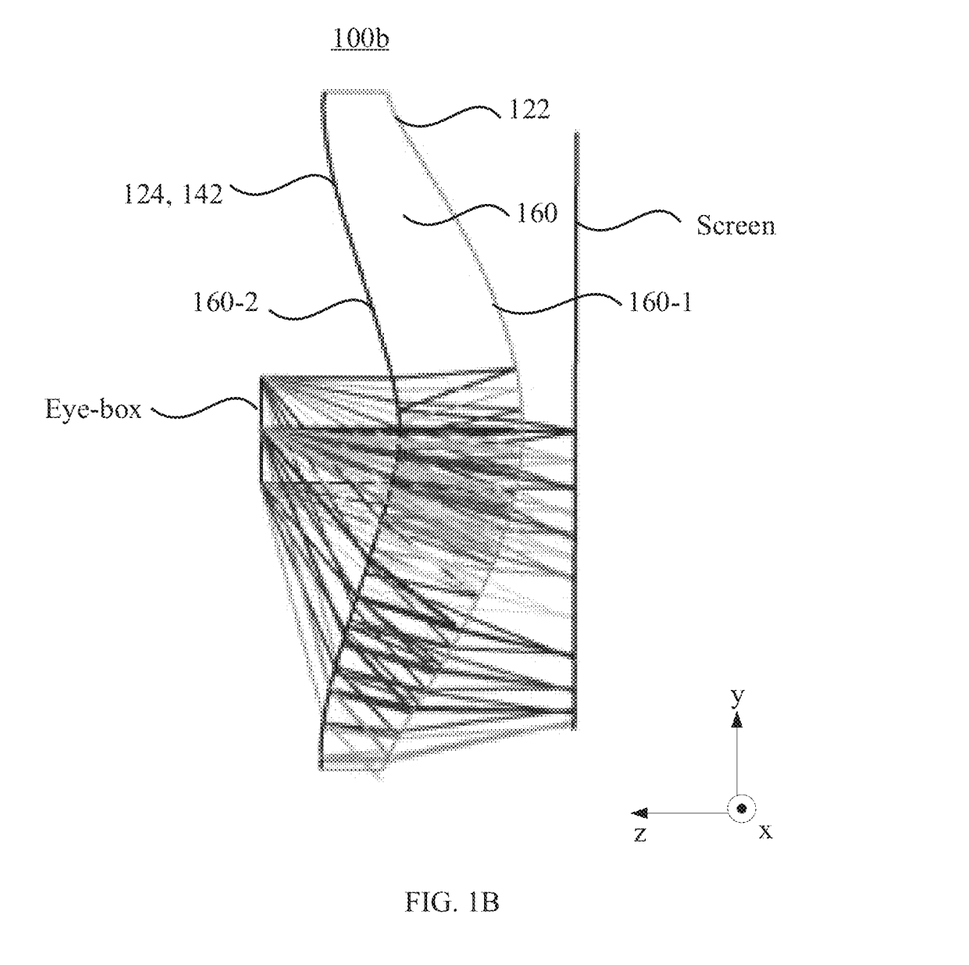

In the embodiments described above in connection with FIG. 1A, the pancake lens includes a front optical element 120 and a back optical element 140. In some other embodiments, a pancake lens consistent with the disclosure can have one optical element or more than two optical elements. In this disclosure, an optical element can include a transparent substrate having two surfaces opposite to each other. FIG. 1B schematically shows another example pancake lens 100*b* consistent with the disclosure. The pancake lens 100*b* can be used in an optical system, such as an HMD, to focus light from a screen to an eye-box, as shown in FIG. 1B.

As shown in FIG. 1B, the pancake lens 100*b* includes a monolithic optical element 160 that includes a transparent substrate. The mirrored surface 122 may be bonded to or formed on a first surface 160-1 of the optical element 160. The waveplate surface 124 and the reflective polarizer surface 142 may be sequentially bonded to or formed on a second surface 160-2 of the optical element 160, and the waveplate surface 124 and the reflective polarizer surface 142 may be coupled to each other without any air gap therebetween. In some other embodiments, the waveplate surface 124 may be bonded to or formed on the first surface 160-1 of the optical element 160 and between the mirrored surface 122 and the transparent substrate.

Consistent with the disclosure, because the light entering the pancake lens 100*a*, 100*b* can be bounced back and forth several times in the pancake lens 100*a*, 100*b* before exiting the pancake lens 100*a*, 100*b*, an optical path in the pancake lens 100*a*, 100*b* can be multiplied, e.g., tripled, as compared to a conventional lens having a comparable size. Accordingly, the compactness and the FOV of the pancake lens 100*a*, 100*b* can be improved.

Figure 1C:
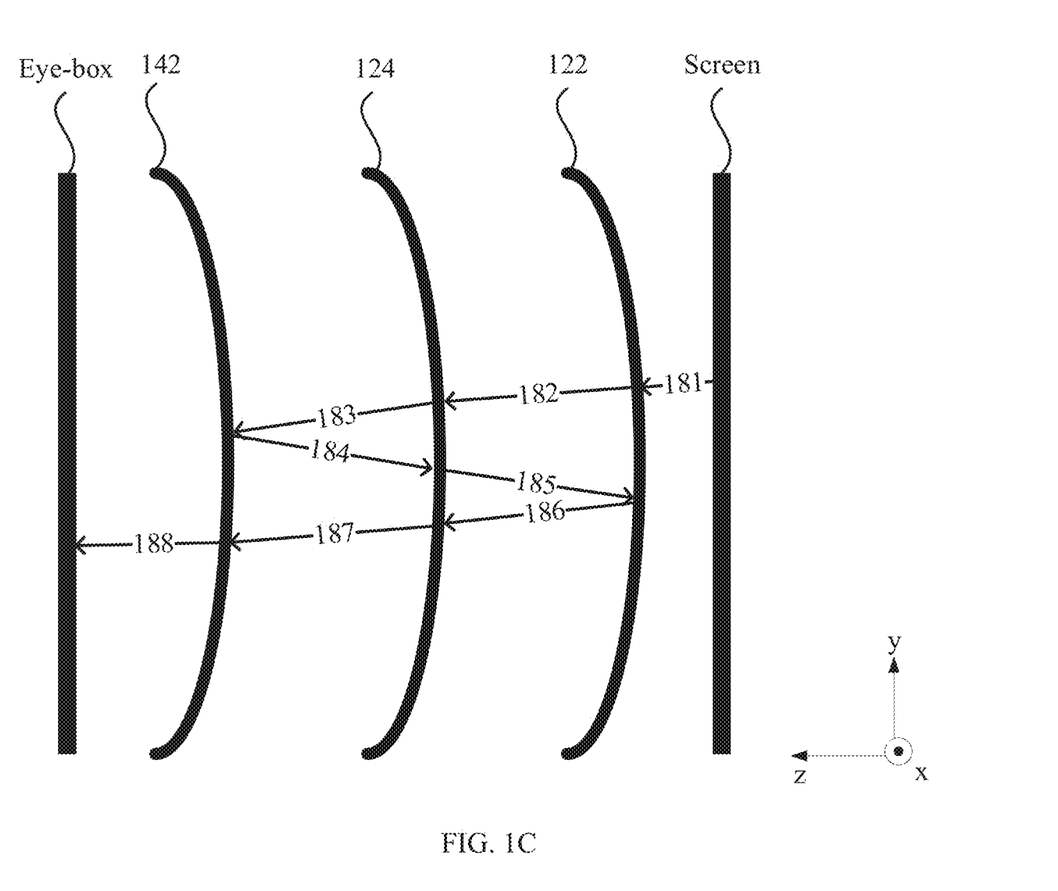

FIG. 1C schematically illustrates a schematic of an example light propagation in a pancake lens consistent with the disclosure, such as the pancake lens 100*a* or the pancake lens 100*b*. As shown in FIG. 1C, light 181 incident on the mirrored surface 122 is circularly polarized. The polarization of the light 181 may be left-handed or right-handed. In some embodiments, the light emitted from the screen is circularly polarized and can directly be used as the light 181. In some other embodiments, the light emitted from the screen is linearly polarized and can be converted to the circularly polarized light 181 by a quarter-wave plate arranged between the screen and the mirrored surface 122. When the light 181 reaches the mirrored surface, a first portion of the light 181 is reflected by the mirrored surface 122, and a second portion of the light 181 is transmitted by the mirrored surface 122, becoming light 182 propagating towards the waveplate surface 124. In some embodiments, the mirrored surface 132 is configured to reflect about 50% of incident light (e.g., the light 181). The waveplate surface 124 can be a quarter-wave plate and changes the polarization of the light 182 from circular to linear (referred to as light 183).

The light 183 is incident on the reflective polarizer surface 142, which can reflect light that is polarized in a blocking direction (e.g., x-axis direction), and transmit light that is polarized in a perpendicular direction (e.g., y-axis direction). At this point, the light 183 is linearly polarized in the blocking direction. Thus, the reflective polarizer surface 142 reflects the light 183 and the reflected light is referred to as light 184, which is then incident on the waveplate surface 124. The waveplate surface 140 converts the linear polarized light 184 to circularly polarized light 185, which is then incident on the mirrored surface 122. The mirrored surface 122 reflects a portion of the polarized light 185, as described above. The reflected portion of the light 185 is referred to as light 186.

The light 186 is also circularly polarized. However, the handedness of polarization of the light 186 is opposite to that of the light 185 and the light 182 due to the reflection from the mirrored surface 122. Thus, the waveplate surface 124 changes the polarization of the circularly polarized light 186 to linearly polarized light 187 having a polarization perpendicular to that of the light 183. Accordingly, the light 187 is linearly polarized in a direction (e.g., y-axis direction) perpendicular to the blocking direction (e.g., x-axis direction) of the reflective polarizer surface 142 and is therefore transmitted by the reflective polarizer surface 142 as light 188 to the eye-box.

For illustrative purposes, in the example shown in FIG. 1C, the light emitted from the screen is left-handed circularly polarized light. In some other embodiments, light emitted from the screen may be linearly polarized light, and a second quarter-wave plate may be arranged between the screen and the mirrored surface 122, or bonded to or formed on the mirrored surface 122 to convert the linearly polarized light to circularly polarized light or vice versa. The second quarter-wave plate may also be an LC quarter-wave plate fabricated on a curved surface.

Figure 2:
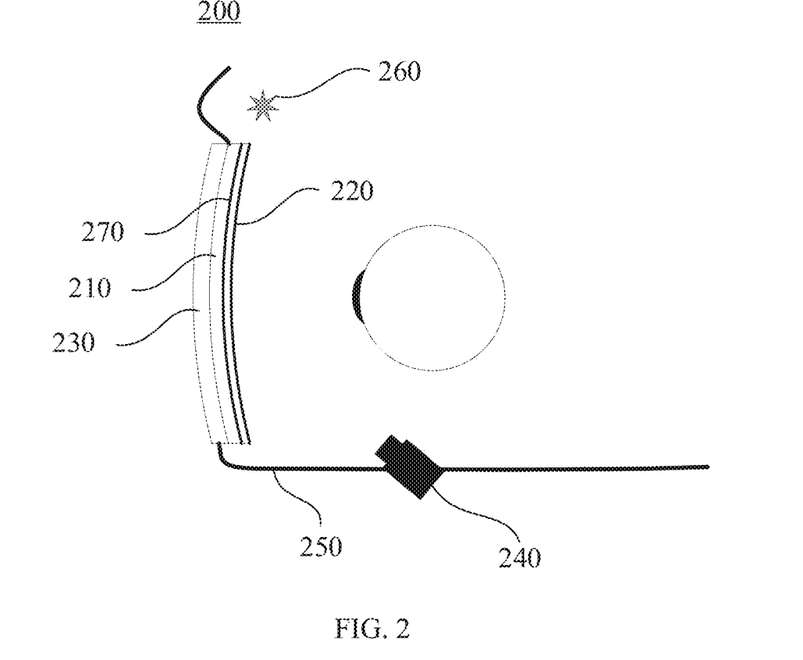
FIG. 2 schematically shows an example optical system consistent with the disclosure.

FIG. 2 schematically shows an example optical system 200 consistent with the disclosure. In FIG. 2, the optical system 200 is shown as an HMD, such as smart glasses. FIG. 2 shows a portion of the optical system 200, where the un-shown portion of the optical system 200 can be symmetric to the illustrated portion of the optical system 200. As shown in FIG. 2, the optical system 200 includes an optical lens 210, a polarization volume hologram (PVH) layer 220 arranged near the optical lens 210, and a display screen 230 arranged facing the optical lens 210. The optical lens 210 can be arranged between the display screen 230 and the PVH layer 220, and can be configured to focus light (image light) from the display screen 230 to an eye-box. In some embodiments, the optical lens 210 can include a pancake lens consistent with the disclosure, such as pancake lens 100a or pancake lens 100b described above in connection with FIGS. 1A-1C.

In some embodiments, the PVH layer 220 can be transparent to the image light, which is visible to human eyes, from the display screen 230, allowing the image light to pass through to focus to the eye-box. On the other hand, the PVH layer 220 can respond to IR light, which is invisible to human eyes, to realize at least one optical function. In some embodiments, the PVH layer 220 can include a birefringent material layer including a plurality of birefringent molecules. For example, the PVH layer 220 can include a liquid crystal (LC) layer, which includes a plurality of LC molecules. The LC molecules are spatially orientated or aligned to enable the at least one optical function of the PVH layer 220. The optical function of the PVH layer 220 can be determined based on the manipulation of optic axes of the LC molecules in the PVH layer 220. Hereinafter, an orientation of the optic axis of an LC molecule is also referred to as an orientation or alignment of the LC molecule. The manipulation of optic axes of the LC molecules in the PVH layer 220 is a 3-dimensional (3D) alignment of the LC molecules. The PVH layer 220 can deflect light via Bragg diffraction. The Bragg grating in the PVH layer 220 can be created by adding a chiral dopant into a birefringent host of the LC layer to induce helical twist along the vertical direction, i.e., the direction perpendicular to the surface of the PVH layer 220. When the LC layer is thick enough, Bragg diffraction can be established. Therefore, in some embodiments, the PVH layer 220 can be configured to deflect incident light in reflection, i.e., reflect light, e.g., IR light, from a target object, such as a user's eye, and can be used, e.g., for tracking the target object.

With the combination of the optical lens 210 and the PVH layer 220, the optical system 200 can project images from the display screen 230 through the optical lens 210 to the user's eye, and at the same time monitor the user's eye and/or the region surrounding the user's eye. By monitoring the user's eye and/or the surrounding region, the optical system 200 can estimate the psychological state and/or changes in the psychological state of the user, as well as physical characteristics of the user. The above information can be used by the optical system 200 to, e.g., determine what content to provide to the user through the display screen 230.

As shown in FIG. 2, the optical system 200 further includes an optical sensor 240 configured to generate images using the light reflected by the PVH layer 220. In some embodiments, the optical sensor 240 can be sensible to light having a wavelength within a spectrum that includes IR spectrum. In some embodiments, the optical sensor 240 can be sensible to IR light but not visible light. The optical sensor 240 can be a camera and can include, for example, a charge-coupled device (CCD) sensor, a complementary metal-oxide-semiconductor (CMOS) sensor, or an N-type metal-oxide-semiconductor (NMOS) sensor.

The optical sensor 240 can be mounted at any suitable part of the optical system 200, so long as the optical sensor 240 can be arranged to face the PVH layer 220 to receive light reflected by the PVH layer 220. In some embodiments, the optical system 200 can include a frame or a housing for supporting components of the optical system 200, and the optical sensor 240 can be mounted on the frame or the housing. As shown in FIG. 2, the optical system 200 further includes a mounting member 250 for mounting the optical system 200 to an object, such as a user's head. The optical sensor 240 can be mounted at the mounting member 250. In some embodiments, the optical system 200 can include smart glasses and the mounting member 250 can include one or more temple arms. The optical sensor 240 can be mounted at one of the one or more temple arms and faces the PVH layer 220.

As shown in FIG. 2, the optical system 200 further includes a light source 260 configured to emit a light beam to be reflected by the target object toward the PVH layer 220. The light beam emitted by the light source 260 can include a narrow spectrum or a relatively broad spectrum, and one or more wavelengths of the light beam are in the IR spectrum, i.e., the spectrum of the light source 260 can be within, overlap, or encompass the IR spectrum. In some embodiments, at least one wavelength in the spectrum of the light source 260 corresponds to the Bragg period of the Bragg grating formed by the LC molecules in the PVH layer 220. In some embodiments, the light beam emitted by the light source 260 has a wavelength in the IR spectrum and corresponding to the Bragg period of the Bragg grating in the PVH layer 220. For example, the wavelength of the light beam can be between about 800 and about 1600 nm. In some embodiments, the light beam can have a band of wavelengths centered at, for example, about 850 nm, about 940 nm, or about 980 nm. In some embodiments, the light source 840 can emit light having two or more peak wavelengths, each being, for example, about 850 nm, about 940 nm, or about 980 nm.

Figure 3:
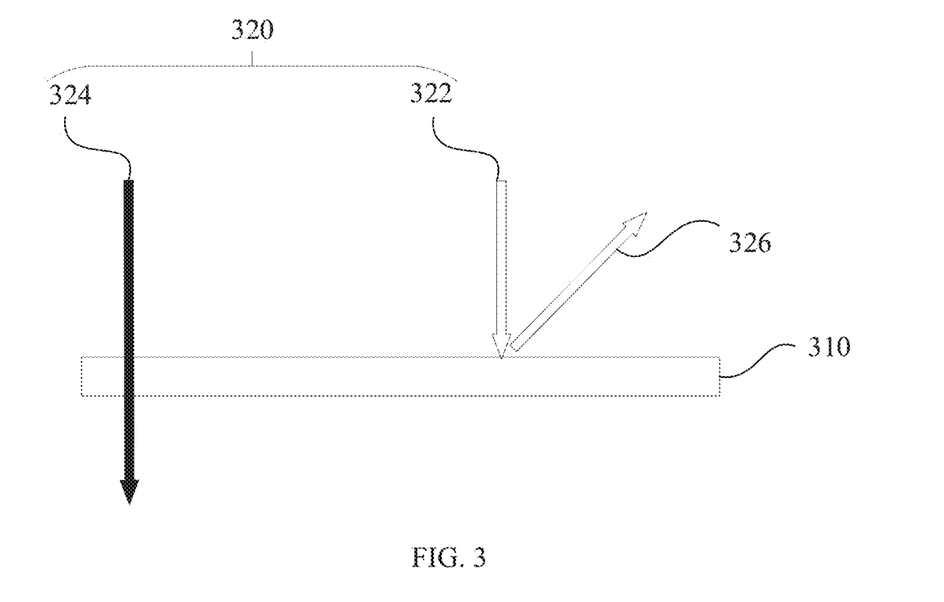
FIG. 3 schematically shows how a PVH layer impact incident light rays.

Light incident on a PVH layer may be reflected or transmitted, depending on the polarization of the light. FIG. 3 schematically shows how a PVH layer 310 impact incident light rays. The PVH layer 310 can be any PVH layer 310 consistent with the disclosure, such as the PVH layer 220 in FIG. 2. For illustrative purpose, in the example shown in FIG. 3, the PVH layer 310 has a helix twist of right handedness (indicated by hollow block in the figure), and incident light 320 includes two components that are polarized in mutually perpendicular (orthogonal) directions, i.e., a first incident light ray 322 having a right-handed circular polarization (indicated by hollow arrow in the figure) and a second incident light ray 324 having a left-handed circular polarization (indicated by solid arrow in the figure). Because the first incident light ray 322 has a same handedness as the helix twist of the PVH layer 310, the first incident light ray 322 is reflected by the PVH layer 310 to form a reflected light ray 326. Further, the PVH layer 310 does not change the handedness of the polarization of the first incident light ray 322 when diverting the first incident light ray 322. Therefore, the reflected light ray 326 retains the handedness of the polarization, i.e., also having a right-handed circular polarization. On the other hand, because the second incident light ray 324 has a different handedness than the helix twist of the PVH layer 310, the second incident light ray 324 can pass through the PVH layer 310 without being reflected and without changing the handedness of the polarization.

As shown in FIG. 3, when the incident light includes two components having orthogonal handednesses of polarization, only one component (also referred to as "reflective component") may be reflected by the PVH layer and the other component (also referred to as "transmissive component") may pass through. That is, the reflectivity of the PVH layer may at best be about 50%. In actual implementation, not all of the reflective component of the incident light can be reflected, and a portion thereof can still be transmitted through the PVH layer. That is, the reflectivity of the PVH layer may be lower than 50%.

Referring again to FIG. 2, incident light, such as incident IR light, from the target object may be partially reflected by the PVH layer 220 to be collected by the optical sensor 240 for imaging the target object. The part of the incident light that is transmitted through the PVH layer 220 may enter the optical lens 210 and be partially or completely reflected by one or more elements of the optical lens 210, such as the reflective polarizer surface 142 of the pancake lens 100a, 100b described above. The light reflected by the elements of the optical lens 210 may also enter the optical sensor 240, forming ghost images superimposed on or distorting the desired image of the target object. The light transmitted through the PVH layer 220 may be bounced between the optical lens 210 and the PVH layer 220 more than once, further blurring the desired image of the target object. This effect is also referred to as "ghost effect" and may affect the quality of the desired image of the target object. Using a high-reflectivity PVH layer as the PVH layer 220 can to some extent reduce the ghost effect. For example, the reflectivity of the PVH layer 220 can be higher than about 40%, higher than about 45%, or higher than about 48%.

However, even if the reflectivity of the PVH layer 220 is 50% and hence all of the reflective component of the incident light can be reflected by the PVH layer 220, the transmissive component of the incident light can still pass through the PVH layer 220, be reflected by elements of the optical lens 210, and form ghost images on the optical sensor 240. To further reduce or eliminate the ghost effect, an additional element may be needed.

Figure 4A:
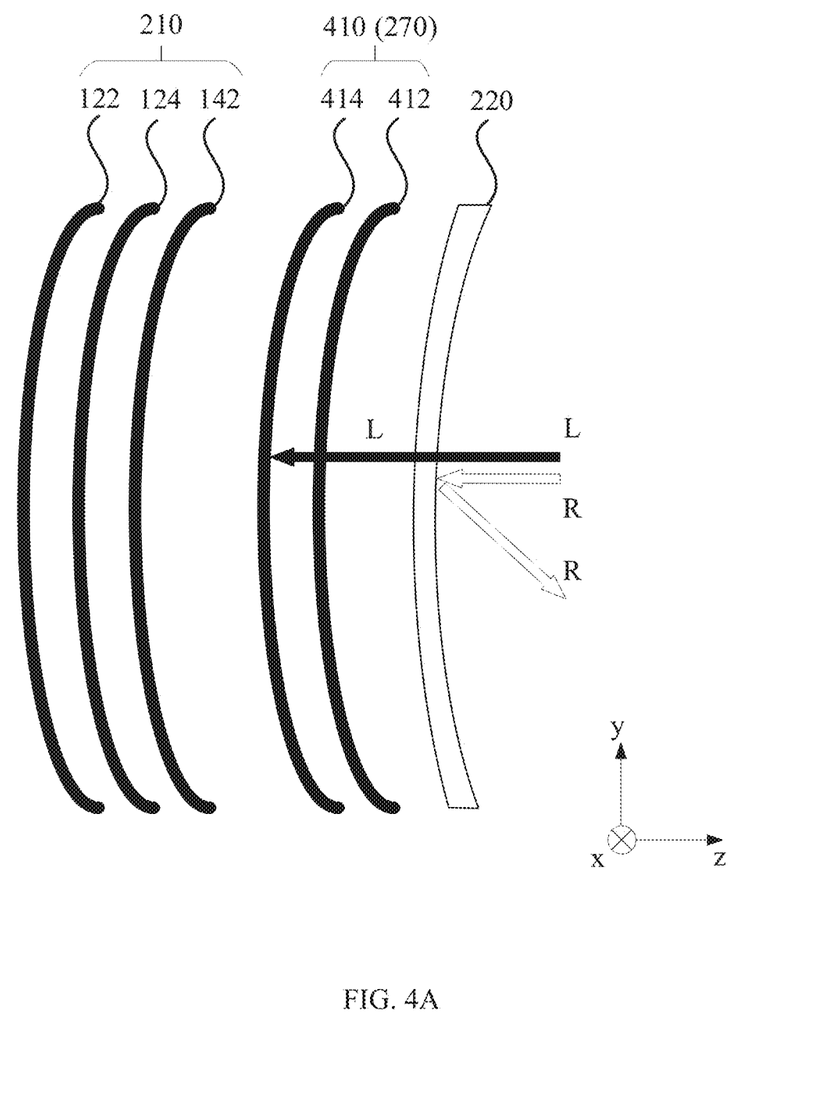
FIGS. 4A-4C schematically show different examples of the optical system consistent with the disclosure.
Figure 4B:
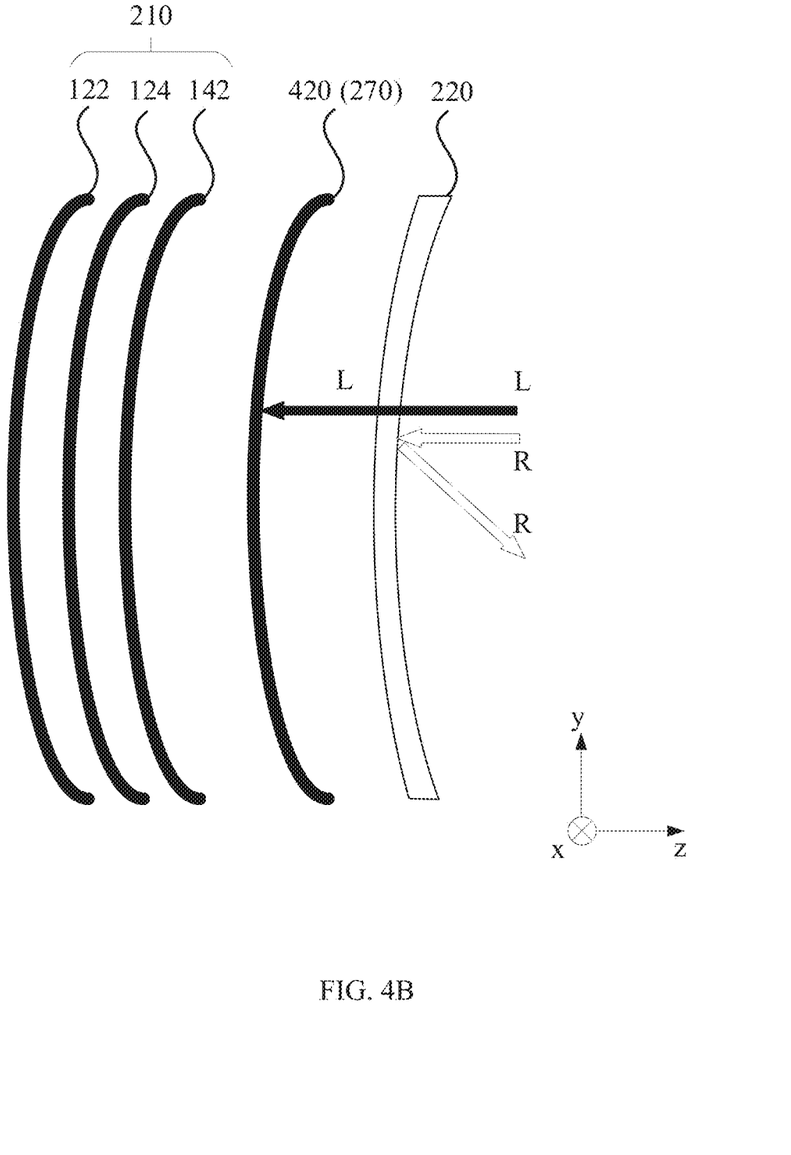
Figure 4C:
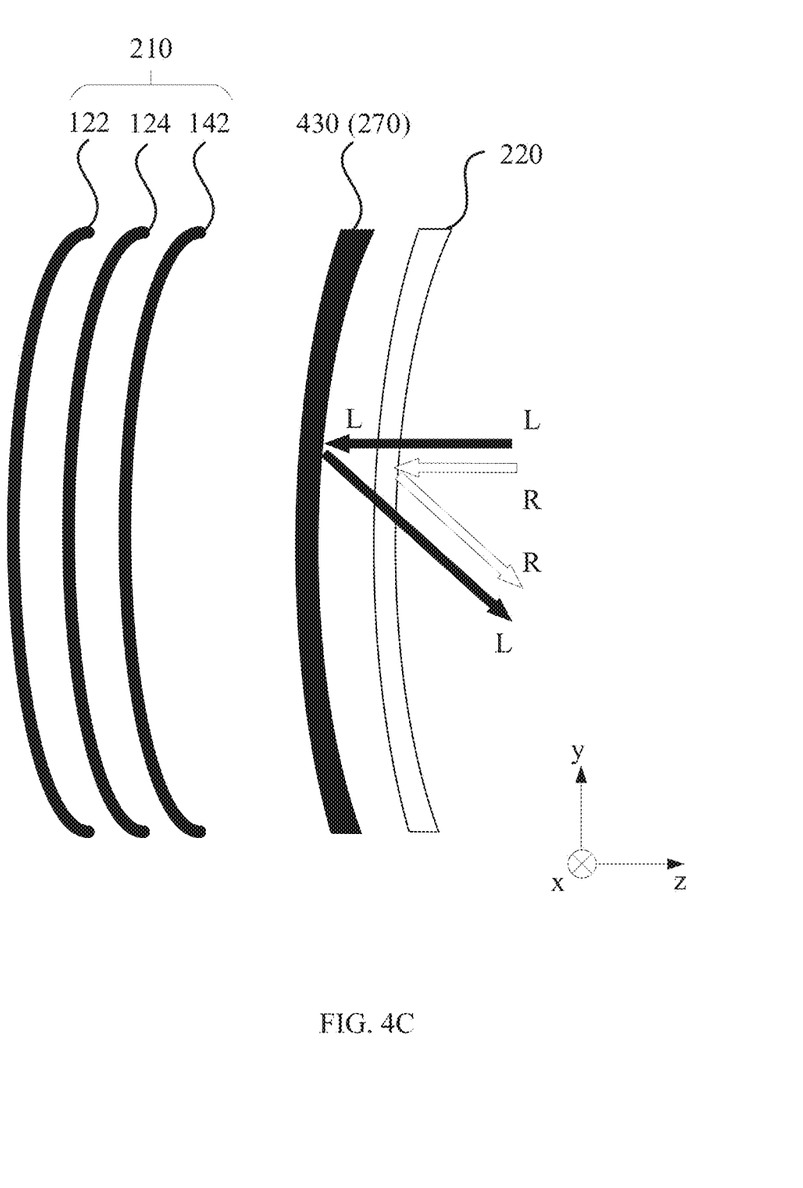

As shown in FIG. 2, the optical system 200 further includes a ghost-effect attenuating element 270 configured to further reduce the ghost effect. The ghost-effect attenuating element 270 is arranged between the optical lens 210 and the PVH layer 220. FIGS. 4A-4C schematically show different examples of the optical system 200. In FIGS. 4A-4C, the portion of the optical system 200 that includes the optical lens 210, the PVH layer 220, and the ghost-effect attenuating element 270 is shown, while other portions of the optical system 200 is omitted. In the examples shown in FIGS. 4A-4C, the optical lens 210 includes a pancake lens consistent with the disclosure, such as the pancake lens 100a or the pancake lens 100b described above, and includes the mirrored surface 122 (e.g., a partial reflector), the waveplate surface 124 (e.g., a quarter-wave plate (QWP)), and the reflective polarizer surface 142.

In the example shown in FIG. 4A, the ghost-effect attenuating element 270 includes an IR absorbing structure 410 arranged between the optical lens 210 and the PVH layer 220. The IR absorbing structure 410 includes a quarter-wave plate (QWP) 412 and a linear absorptive polarizer 414 configured to absorb IR light. As shown in FIG. 4A, the mirrored surface 122, the waveplate surface 124, the reflective polarizer surface 142, the linear absorptive polarizer 414, the QWP 412, and the PVH layer 220 are arranged in optical series.

Optical series refers to relative positioning of a plurality of optical elements, such that light, for each optical element of the plurality of optical elements, is transmitted by that optical element before being transmitted by another optical element of the plurality of optical elements. Moreover, ordering of the optical elements does not matter. For example, optical element A placed before optical element B, or optical element B placed before optical element A, are both in optical series. Similar to electric circuitry design, optical series represents optical elements with their optical properties compounded when placed in series.

When IR light incident on the PVH layer 220, one component of the incident IR light that has a handedness of polarization same as the handedness of the helix twist of the PVH layer 220 can be reflected and the other component of the incident IR light that has an orthogonal handedness of polarization can be transmitted. For illustrative purposes, in the example shown in FIG. 4A, the PVH layer 220 has a helix twist of right handedness (indicated by hollow block in the figure). Therefore, one component of the incident IR light that has a right-handed circular polarization (indicated by hollow arrow in the figure) can be reflected by the PVH layer 220, and the other component of the incident IR light that has a left-handed circular polarization (indicated by solid arrow in the figure) can be transmitted through the PVH layer 220. The transmitted light retains the left-handed circular polarization. When the transmitted light reaches the QWP 412, it is converted to linearly polarized light by the QWP 412. The polarization direction of the linearly polarized light is the same as the blocking direction (i.e., perpendicular to the transmission direction) of the linear absorptive polarizer 414 and hence cannot transmit through the linear absorptive polarizer 414. Further, because the linear absorptive polarizer 414 is absorptive, the linearly polarized light is absorbed by the linear absorptive polarizer 414 and hence does not bounce back to reach the optical sensor 240.

In some embodiments, the linear absorptive polarizer 414 and the reflective polarizer surface 142 can have an approximately same polarization direction, such that image light that passes through the reflective polarizer surface 142 can also pass through the linear absorptive polarizer 414. Therefore, the IR absorbing structure 410 may not affect the user viewing images displayed on the display screen 230.

The example of the optical system 200 shown in FIG. 4B is similar to that shown in FIG. 4A, except that in the example shown in FIG. 4B, the ghost-effect attenuating element 270 includes an absorbing film 420 arranged between the optical lens 210 and the PVH layer 220. The absorbing film 420 can be made of an IR absorbing material, such as an IR absorbing material having an absorption wavelength range approximately same as the emission wavelength range of the light source 260, or an absorption wavelength range encompassing the emission wavelength range of the light source 260.

When the IR light emitted by the light source 260 is reflected by a target object and reaches the PVH layer 220, a portion of the light (the left-handed circularly polarized component) can be transmitted through the PVH layer 220 and reach the absorbing film 420. Because the wavelength of the transmitted light is within the absorption wavelength range of the absorbing film 420, the transmitted light can be at least partially absorbed by the absorbing film 420. In some embodiments, the transmitted light can be almost completely absorbed by the absorbing film 420. As a result, the amount of IR light reflected by the components of the optical lens 210 to the optical sensor 240 can be reduced or eliminated.

The example of the optical system 200 shown in FIG. 4C is similar to that shown in FIG. 4A, except that in the example shown in FIG. 4C, the ghost-effect attenuating element 270 includes another PVH layer 430 arranged between the optical lens 210 and the PVH layer 220. In some embodiments, a handedness of a helix twist of the PVH layer 430 can be orthogonal to the handedness of the helix twist of the PVH layer 220. In the example shown in FIG. 4C, the PVH layer 220 has a helix twist of right handedness and the PVH layer 430 has a helix twist of left handedness (indicated by solid block in the figure).

As shown in FIG. 4C, the right-handed circularly polarized component of the incident IR light can be reflected by the PVH layer 220, and the left-handed circularly polarized component of the incident IR light can be transmitted through the PVH layer 220, which retains the left-handed circular polarization. When the transmitted light reaches the PVH layer 430, because it has a handedness of polarization that is the same as the handedness of helix twist of the PVH layer 430, the transmitted light can be reflected by the PVH layer 430, which can then be transmitted through the PVH layer 220.

Optical properties of a PVH layer, such as optical power, optical center, and optical axis direction of the PVH layer, and wavelength and polarization handedness to which the PVH layer respond, can be configured by configuring the orientation and/or alignment of the LC molecules in the PVH layer. The optical power of a PVH layer determines a degree to which the PVH layer can converge or diverge light and can be inversely proportional to a focal length or effective focal length of the PVH layer. The optical power of the PVH layer can be adjusted by changing the alignment of the LC molecules in the PVH layer. Changing the optical power of a PVH layer may also change a field of view (FOV) of the PVH layer. Similar to the optical power, the optical axis of a PVH layer can also be adjusted by changing the alignment of the LC molecules in the PVH layer. The direction of the optical axis of the PVH layer may or may not be perpendicular to the surface of the PVH layer.

In some embodiments, the optical properties of the PVH layer 430 can be configured such that the IR light reflected by the PVH layer 430 cannot reach the optical sensor 240. For example, the optical axis direction of the PVH layer 430 can be configured to have a large angle with respect to the optical axis direction of the PVH layer 220. As such, when the optical sensor 240 receives light reflected by the PVH layer 220 to form images, the optical sensor 240 cannot receive light reflected by the PVH layer 430.

In some embodiments, the PVH layer 430 can be arranged very close to the PVH layer 220, e.g., contacting the PVH layer 220 without gap therebetween. In these embodiments, the PVH layer 430 can be configured to have same or similar optical properties as the PVH layer 220, except for the polarization direction to which the PVH layer 430 responds. For example, the PVH layer 430 can have a same or approximately same optical power as the PVH layer 220, the PVH layer 430 can have a same or approximately same optical axis direction as the PVH layer 220, and/or the PVH layer 430 can respond to same or approximately same wavelength(s) as the PVH layer 220. In these embodiments, because the PVH layer 430 and the PVH layer 220 are very close to each other and have same or similar optical properties except for the polarization directions to which they respond, images formed by the PVH layer 430 and images formed by the PVH layer 220 can almost completely overlap each other with no or very small deviation therebetween. Therefore, with this configuration, almost all of the incident IR light can be used for imaging the target object, which reduces the loss of the incident light.

Figure 5:
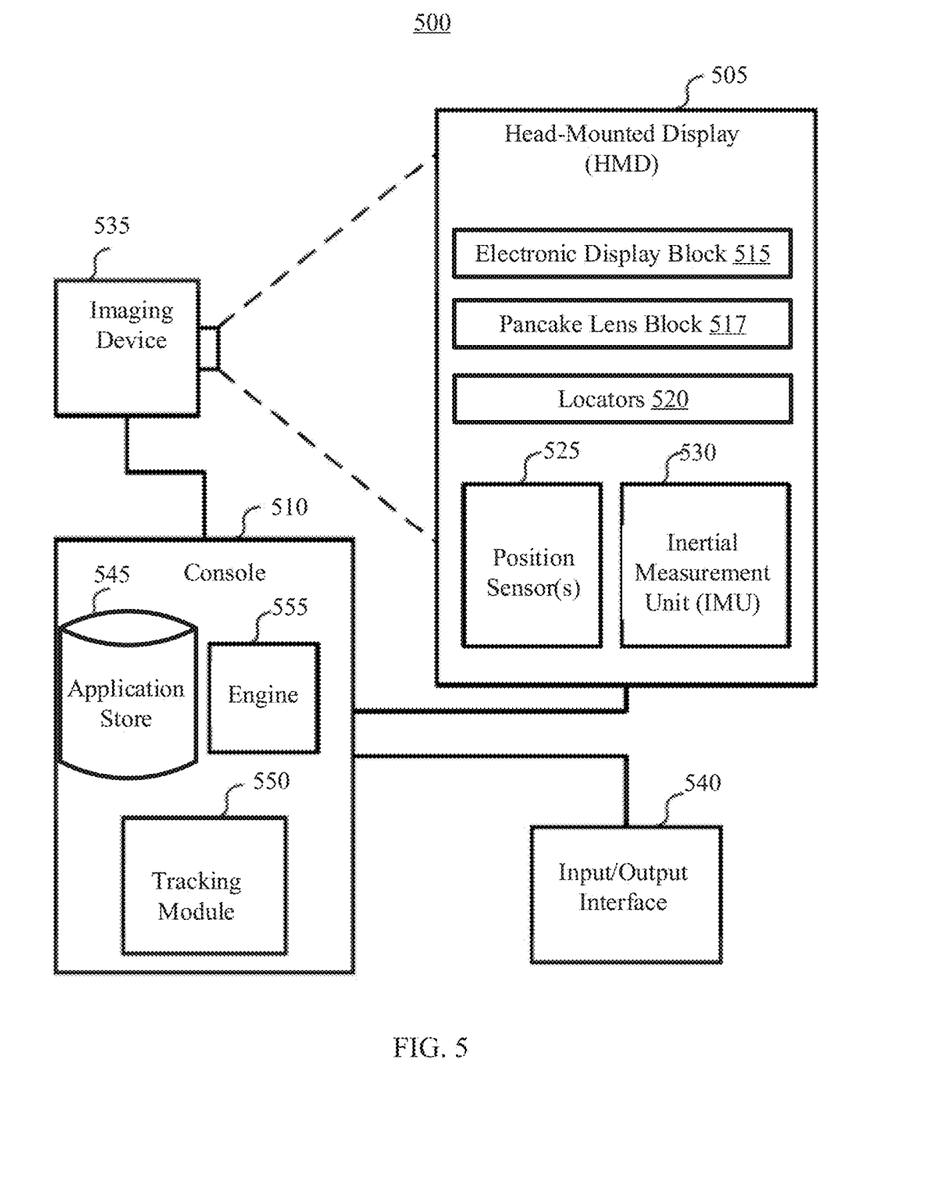
FIG. 5 shows a block diagram of an example system environment consistent with the disclosure.

FIG. 5 shows a block diagram of an example system environment 500 consistent with the disclosure. The system environment 500 includes an HMD 505, a console 510, an imaging device 535, and an input/output interface 540. The HMD 505, the imaging device 535, and the input/output interface 540 are coupled to the console 510. Although FIG. 5 shows an example system 500 including one HMD 505, one imaging device 535, and one input interface 540, in some other embodiments, any number of these components may be included in the system environment 500. For example, the system environment 500 may include multiple HMDs 505 each having an associated input interface 540 and being monitored by one or more imaging devices 535, and each HMD 505, input interface 540, and imaging device 535 may communicate with the console 510. In some embodiments, different and/or additional components may be included in the system environment 500. The system environment 500 may operate in a VR system environment, an AR system environment, a MR system environment, or some combination thereof.

The HMD 505 may be a head-mounted display that presents media to a user. Examples of media presented by the HMD include one or more images, video, audio, or some combination thereof. In certain embodiments, audio may be presented via an external device (e.g., speakers and/or headphones) which receives audio information from the HMD 505, the console 510 or both, and presents audio data based on the audio information. An example of the HMD 505 is further described below in connection with FIGS. 6A and 6B.

The HMD 505 may include one or more rigid bodies, which may be rigidly or non-rigidly coupled to each other. A rigid coupling between rigid bodies may cause the coupled rigid bodies to act as a single rigid entity. In contrast, a non-rigid coupling between rigid bodies may allow the rigid bodies to move relative to each other. In some embodiments, the HMD 505 may present VR, AR, MR, or some combination thereof to the user. In the VR, AR and/or MR embodiments, the HMD 505 may augment views of a physical, real-world environment with computer-generated elements (e.g., images, video, sound, etc.).

As shown in FIG. 5, the HMD 505 includes an electronic display block 515, a pancake lens block 517, one or more locators 520, one or more position sensors 525, and an inertial measurement unit (IMU) 530. The electronic display block 515 may display images to the user in accordance with data received from the console 510. In some embodiments, the electronic display block 515 may include an electronic display and an optics block. The electronic display may generate image light. In some embodiments, the electronic display may include a single electronic display or multiple electronic displays (e.g., a display for each eye of a user). Examples of the electronic display may include: a liquid crystal display (LCD), an organic light emitting diode (OLED) display, an active-matrix organic light-emitting diode display (AMOLED), a transparent organic light emitting diode display (TOLED), some other display, a projector, or a combination thereof.

The optics block may include combinations of different optical elements. An optical element may be an aperture, a Fresnel lens, a convex lens, a concave lens, a filter, or any other suitable optical element that affects the image light emitted from the electronic display. In certain embodiments, one or more of the optical elements in the optics block may have one or more coatings, such as anti-reflective coatings. Magnification of the image light by the optics block may allow elements of the electronic display to be physically smaller, weigh less, and consume less power than larger displays. Additionally, magnification may increase a field of view of the displayed media. For example, the field of view of the displayed media is widened, such that the displayed media is presented using almost all (e.g., 110 degrees diagonal), and in some cases all, of the user's field of view. In some embodiments, the optics block may be designed to have an effective focal length larger than the spacing to the electronic display, thereby magnifying the image light projected by the electronic display. Additionally, in some embodiments, the amount of magnification may be adjusted by adding or removing optical elements.

The pancake lens block 517 may include one or more optical elements including a mirrored surface, a waveplate surface, and a reflective polarizer surface that focus image light from the electronic display to the eyes of the user. In particular, the waveplate surface and/or the reflective polarizer surface may be an LC waveplate fabricated on a curved surface. The pancake lens block 517 may be configured as a monolithic pancake lens block without any air gaps between optical elements of the pancake lens block. The pancake lens block 517 may also magnify received light from the electronic display, correct optical aberrations associated with the image light, and the corrected image light may be presented to a user of the HMD 505.

The locators 520 may be objects located at various positions on the HMD 505 relative to one another and relative to a specific reference point on the HMD 505. A locator 520 may be a light emitting diode (LED), a corner cube reflector, a reflective marker, a type of light source that contrasts with an environment in which the HMD 505 operates, or a combination thereof. In some embodiments, when the locators 520 are active (i.e., an LED or other type of light-emitting device) elements, the locators 520 may emit light in the visible band (about 380 nm to about 550 nm), in the infrared (IR) band (about 750 nm to about 1 mm), in the ultraviolet band (about 10 nm to about 380 nm), another portion of the electromagnetic spectrum, or a combination thereof.

In some embodiments, the locators 520 may be located beneath an outer surface of the HMD 505, which can be transparent to the wavelengths of light emitted or reflected by the locators 520 or can be thin enough to not substantially attenuate the wavelengths of light emitted or reflected by the locators 520. In some embodiments, the outer surface or other portions of the HMD 505 may be opaque in the visible band of wavelengths of light. Thus, the locators 520 may emit light in the IR band under an outer surface that is transparent in the IR band but opaque in the visible band.

The IMU 530 may be an electronic device that generates fast calibration data based on measurement signals received from one or more of the position sensors 525. A position sensor 525 may generates one or more measurement signals in response to motion of the HMD 505. Examples of position sensors 525 may include: one or more accelerometers, one or more gyroscopes, one or more magnetometers, another suitable type of sensor that detects motion, a type of sensor used for error correction of the IMU 530, or one or more combinations thereof. The position sensors 525 may be located external to the IMU 530, internal to the IMU 530, or a combination thereof.

Based on the one or more measurement signals from one or more position sensors 525, the IMU 530 may generates fast calibration data indicating an estimated position of the HMD 505 relative to an initial position of the HMD 505. For example, the position sensors 525 may include multiple accelerometers to measure translational motion (forward/back, up/down, left/right) and multiple gyroscopes to measure rotational motion (e.g., pitch, yaw, roll). In certain embodiments, the IMU 530 may rapidly samples the measurement signals and calculates the estimated position of the HMD 505 from the sampled data. For example, the IMU 530 may integrate the measurement signals received from the accelerometers over time to estimate a velocity vector and integrates the velocity vector over time to determine an estimated position of a reference point on the HMD 505. In some embodiments, the IMU 530 may provide the sampled measurement signals to the console 510, which determines the fast calibration data. The reference point may be a point that may be used to describe the position of the HMD 505. While the reference point may generally be defined as a point in space; however, in practice the reference point may be defined as a point within the HMD 505 (e.g., a center of the IMU 530).

The IMU 530 may receive one or more calibration parameters from the console 510. As further discussed below, the one or more calibration parameters may be used to maintain tracking of the HMD 505. Based on a received calibration parameter, the IMU 530 may adjust one or more IMU parameters (e.g., sample rate). In certain embodiments, certain calibration parameters may cause the IMU 530 to update an initial position of the reference point, so it corresponds to a next calibrated position of the reference point. Updating the initial position of the reference point as the next calibrated position of the reference point may help reduce accumulated error associated with the determined estimated position. The accumulated error, also referred to as drift error, may cause the estimated position of the reference point to "drift" away from the actual position of the reference point over time.

The imaging device 535 may generate slow calibration data in accordance with calibration parameters received from the console 510. Slow calibration data may include one or more images showing observed positions of the locators 520 that are detectable by the imaging device 535. The imaging device 535 may include one or more cameras, one or more video cameras, any other device capable of capturing images including one or more of the locators 520, or some combination thereof. Additionally, the imaging device 535 may include one or more filters (e.g., used to increase signal to noise ratio). The imaging device 535 may be configured to detect light emitted or reflected from locators 520 in a field of view of the imaging device 535.

In some embodiments, when the locators 520 include passive elements (e.g., a retroreflector), the imaging device 535 may include a light source that illuminates some or all of the locators 520, which retro-reflect the light towards the light source in the imaging device 535. Slow calibration data may be communicated from the imaging device 535 to the console 510, and the imaging device 53 may receive one or more calibration parameters from the console 510 to adjust one or more imaging parameters (e.g., focal length, focus, frame rate, ISO, sensor temperature, shutter speed, aperture, etc.).

The input interface 540 may be a device that allows a user to send action requests to the console 510. An action request is a request to perform a particular action. For example, an action request may be to start or end an application or to perform a particular action within the application. The input interface 540 may include one or more input devices. Example input devices may include: a keyboard, a mouse, a game controller, or any other suitable device for receiving action requests and communicating the received action requests to the console 510. An action request received by the input interface 540 may be communicated to the console 510, which performs an action corresponding to the action request. In some embodiments, the input interface 540 may provide haptic feedback to the user in accordance with instructions received from the console 510. For example, haptic feedback may be provided when an action request is received, or the console 510 may communicate instructions to the input interface 540 causing the input interface 540 to generate haptic feedback when the console 510 performs an action.

The console 510 may provide media to the HMD 505 for presentation to the user in accordance with information received from one or more of: the imaging device 535, the HMD 505, and the input interface 540. In some embodiments, as shown in FIG. 5, the console 510 includes an application store 545, a tracking module 550, and a virtual reality (VR) engine 555. In some embodiments, the console 510 may include modules different from those described in conjunction with FIG. 5. Similarly, the functions further described below may be distributed among components of the console 510 in a different manner than is described here.

The application store 545 may store one or more applications for execution by the console 510. An application is a group of instructions, that when executed by a processor, may generate content for presentation to the user. Content generated by an application may be in response to inputs received from the user via movement of the HMD 505 or the input interface 540. Examples of applications may include: gaming applications, conferencing applications, video playback application, or other suitable applications.

The tracking module 550 may calibrate the system 500 using one or more calibration parameters and may adjust one or more calibration parameters to reduce error in determination of the position of the HMD 505. For example, the tracking module 550 may adjust the focus of the imaging device 535 to obtain a more accurate position for observed locators on the HMD 505. Moreover, calibration performed by the tracking module 550 may also account for information received from the IMU 530. Additionally, when tracking of the HMD 505 is lost (e.g., the imaging device 535 loses line of sight of at least a threshold number of the locators 520), the tracking module 550 may re-calibrate some or all of the system environment 500.

The tracking module 550 may track movements of the HMD 505 using slow calibration information from the imaging device 535. The tracking module 550 may determine positions of a reference point of the HMD 505 using observed locators from the slow calibration information and a model of the HMD 505. The tracking module 550 may also determine positions of a reference point of the HMD 505 using position information from the fast calibration information. Additionally, in certain embodiments, the tracking module 550 may use portions of the fast calibration information, the slow calibration information, or some combination thereof, to predict a future location of the HMD 505. The tracking module 550 may provide the estimated or predicted future position of the HMD 505 to the engine 555.

The engine 555 may execute applications within the system environment 500 and receives position information, acceleration information, velocity information, predicted future positions, or some combination thereof of the HMD 505 from the tracking module 550. Based on the received information, the engine 555 may determine content to provide to the HMD 505 for presentation to the user. For example, when the received information indicates that the user has looked to the left, the engine 555 may generate content for the HMD 505 that mirrors the user's movement in a virtual environment. Additionally, the engine 555 may perform an action within an application executing on the console 510 in response to an action request received from the input interface 540, and provide feedback to the user that the action was performed. The provided feedback may be visual or audible feedback via the HMD 505 or haptic feedback via the input interface 540.

Figure 6A:
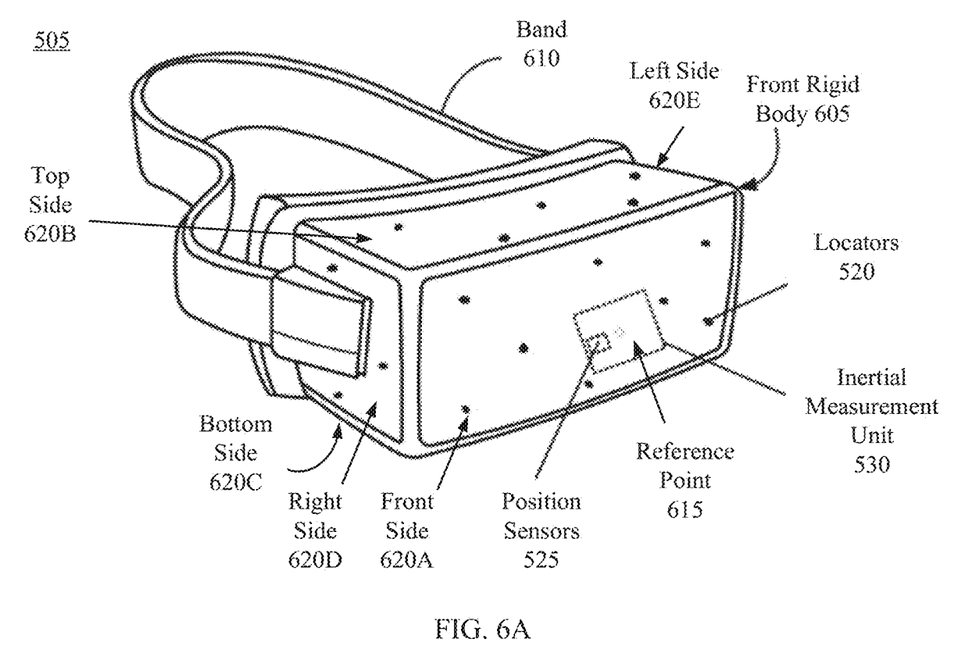
FIG. 6A illustrates a diagram of an HMD shown in FIG. 5.

FIG. 6A illustrates a diagram of the HMD 505 in FIG. 5. Referring to FIG. 6A and FIG. 5, the HMD 505 includes a front rigid body 605 and a band 610. The front rigid body 605 may include one or more electronic display elements of the electronic display and optics block (not shown in FIG. 6A), the IMU 530, the one or more position sensors 525, and the locators 520. In the example shown in FIG. 6A, the position sensors 525 may be located within the IMU 530, and neither the IMU 530 nor the position sensors 525 may be visible to the user.

The locators 520 may be located at fixed positions on the front rigid body 605 relative to one another and relative to a reference point 615. In the example shown in FIG. 6A, the reference point 615 is located at the center of the IMU 530. Each of the locators 520 may emit light that is detectable by the imaging device 535. The locators 520, or some of the locators 520, may be located on a front side 620A, a top side 620B, a bottom side 620C, a right side 620D, and a left side 620E of the front rigid body 605.

Figure 6B:
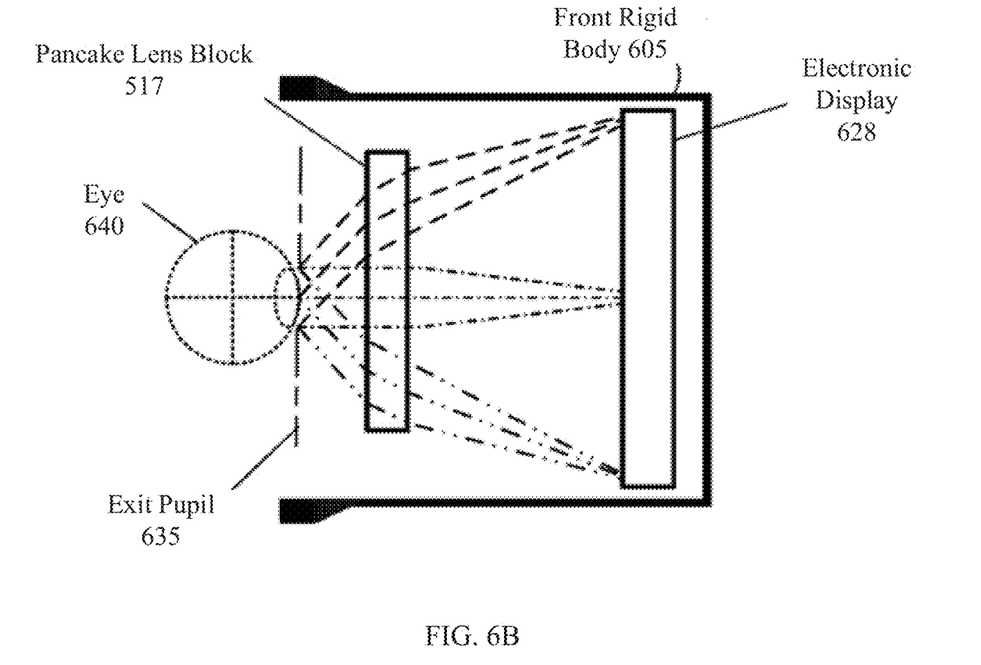
FIG. 6B is a cross-sectional view of a front rigid body of the HMD shown in FIG. 6A.

FIG. 6B is a cross-sectional view of the front rigid body 605 of the HMD 505 shown in FIG. 6A. As shown in FIG. 6B, the front rigid body 605 includes the electronic display 628 and the pancake lens block 517 that provides altered image light to an exit pupil 635. The exit pupil 635 may be at a location of the front rigid body 605 where a user's eye 640 is positioned. For illustrative purposes, FIG. 6B shows a cross-section of the front rigid body 605 associated with a single eye 640, while another electronic display, separate from the electronic display 628, can provide image light altered by the optics block to another eye of the user.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical system comprising:
a display screen;
an optical lens;
a polarization volume hologram (PVH) layer configured to reflect an infrared (IR) light, wherein the display screen and the PVH layer are disposed at opposite sides of the optical lens; and
an IR absorbing structure arranged between the optical lens and the PVH layer, the IR absorbing structure including:
a quarter-wave plate (QWP) arranged between the optical lens and the PVH layer; and
a linear absorptive polarizer arranged between the QWP and the optical lens, the linear absorptive polarizer being configured to absorb the IR light.

2. The optical system of claim 1, wherein:
the QWP is a first QWP; and
the optical lens includes:
a partial reflector;
a reflective polarizer arranged between the partial reflector and the IR absorbing structure; and
a second QWP arranged between the partial reflector and the IR absorbing structure.

3. The optical system of claim 2, wherein the partial reflector is a 50/50 mirror.

4. The optical system of claim 2, wherein:
the optical lens further includes a transparent substrate having a first surface and a second surface opposite to each other,
the partial reflector is arranged over the first surface,
the reflective polarizer is arranged over the second surface, and
the second QWP is arranged over the first surface or at the second surface.

5. The optical system of claim 2, wherein the linear absorptive polarizer and the reflective polarizer have an approximately same polarization direction.

6. The optical system of claim 1, further comprising:
an optical sensor configured to generate an image using the IR light reflected by the PVH layer.

7. The optical system of claim 6, further comprising:
a frame supporting the optical lens, the PVH layer, the QWP, and the linear absorptive polarizer.

8. The optical system of claim 7, further comprising:
a temple arm connected to the frame,
wherein the optical sensor is mounted on the temple arm and faces the PVH layer.

9. The optical system of claim 6, further comprising:
a light source configured to emit a light beam having a wavelength in IR spectrum.

10. The optical system of claim 1,
wherein the optical lens is arranged between the display screen and the IR absorbing structure.

11. An optical system comprising:
an optical lens;
a polarization volume hologram (PVH) layer arranged over the optical lens, the PVH layer being configured to reflect a first component of an infrared (IR) light away from the optical lens, and transmit a second component of the IR light toward the optical lens, polarizations of the first component and the second component having orthogonal handednesses; and
an absorbing film including an IR light absorbing material and arranged between the optical lens and the PVH layer, the absorbing film configured to absorb the second component of the IR light output from the PVH layer toward the optical lens.

12. An optical system comprising:
an optical lens;

a first polarization volume hologram (PVH) layer arranged over the optical lens; and a second PVH layer arranged between the optical lens and the first PVH layer;

wherein the first PVH layer and the second PVH layer are configured to reflect an IR light, wherein the first PVH layer is configured to reflect a first component of the IR light and transmit a second component of the IR light toward the second PVH layer and the optical lens, polarizations of the first component and the second component having orthogonal handednesses, and wherein the second PVH layer is configured to reflect the second component of the IR light back to the first PVH layer and away from the optical lens, and wherein the optical lens includes:
 a partial reflector;
 a reflective polarizer arranged between the partial reflector and the second PVH layer; and
 a quarter-wave plate arranged between the partial reflector and the second PVH layer.

13. The optical system of claim 12, wherein a first handedness of a first helix twist of the first PVH layer and a second handedness of a second helix twist of the second PVH layer are orthogonal to each other.

14. The optical system of claim 12, wherein a reflectivity of each of the first PVH layer and the second PVH layer is higher than about 40%.

15. The optical system of claim 14, wherein the reflectivity of each of the first PVH layer and the second PVH layer is higher than about 45%.

16. The optical system of claim 15, wherein the reflectivity of each of the first PVH layer and the second PVH layer is higher than about 48%.

17. The optical system of claim 12, wherein the first PVH layer and the second PVH layer have an approximately same optical power.

* * * * *